July 6, 1954  F. WALLER ET AL  2,682,722
LINKED HOLDER FOR LANTERN SLIDES
Original Filed Nov. 17, 1948
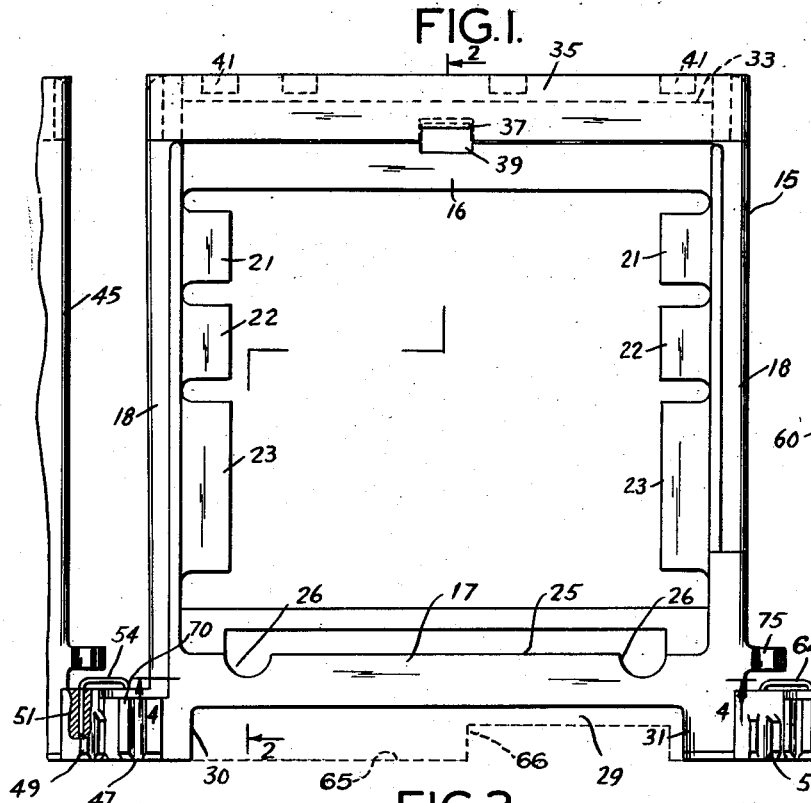
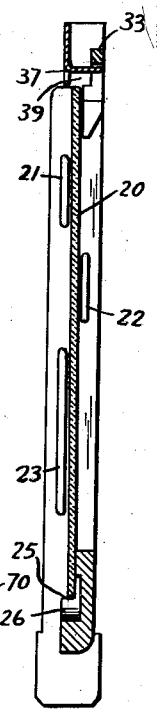
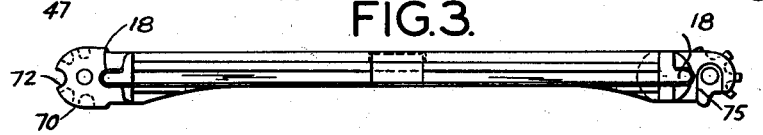
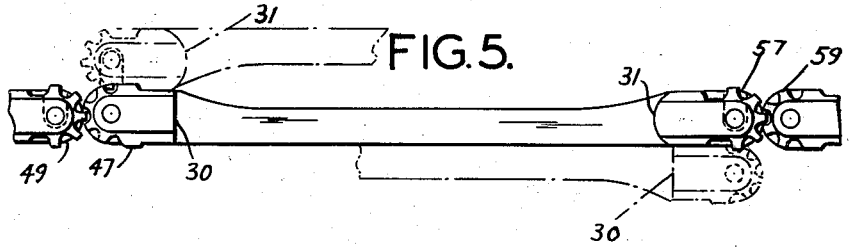
INVENTORS
BY
ATTORNEYS.

UNITED STATES PATENT OFFICE 2,682,722

LINKED HOLDER FOR LANTERN SLIDES

Fred Waller, Huntington, and Waldo M. Mac-Laury, Cold Spring Harbor, N. Y., assignors to The Vitarama Corporation, Long Island, N. Y., a corporation of New York Original application November 17, 1948, Serial No. 60,542, now Patent No. 2,563,893, dated August 14, 1951. Divided and this application December 4, 1948, Serial No. 63,584

7 Claims. (Cl. 40—152)

This invention relates to apparatus for holding slides that are to be projected successively, and the invention relates particularly to a novel slide holder construction with a combination of links and gear segments for connecting successive slide holders together in such a way that they can be folded against one another into a compact relation.

One object of the invention is to provide an improved slide holder which is connected with other and similar slide holders to form a chain having novel connecting means at which the slide holders can be separated from one another only when they are in one particular angular relation to one another. When in folded relation, the slide holders are connected together in such a way that a pack of holders can be picked up by the end slide holders of the pack.

Another object of the invention is to provide a linked connection between successive slide holders of the chain with gear segments on the connected slide holders for causing the slide holders to fold into parallel relation with one another as they swing in either direction about their linked connections.

One feature of the gear segment construction insures against assembly of the slide holders with the teeth of the gear segments meshed in any way other than a symmetrical relation that permits a swinging movement of the slide holder equally in both directions from a central, extended position in substantial alignment with the next adjacent slide holder of the chain.

The slide holders of this invention are constructed in such a way as to facilitate the insertion and removal of slides, and are constructed with walls or shoulders that cooperate with guide ridge and with feeding mechanism of the slide changing apparatus with which this invention is intended to be used.

Although the invention will be described in connection with holders for slides which are to be projected, it will be understood that features of the invention are also applicable to larger slides which are illuminated for direct exhibition.

This invention is intended for use with the slide projector and feed mechanism disclosed in the patent application of Waller and Shields, Serial No. 60,542, filed November 17, 1948.

Other objects, features and advantages of the invention will appear or be pointed out as the description proceeds.

In the drawing, forming a part hereof, in which like reference characters indicate corresponding parts in all the views, Fig. 1 is a front elevation, partly broken away and in section, showing a slide holder of this invention connected at its opposite ends with similar slide holders to form a chain.

Fig. 2 is a sectional view taken on the line 2—2 of Fig. 1.

Fig. 3 is a top plan view of the center slide holder of Fig. 1.

Fig. 4 is a sectional view taken on the line 4—4 of Figure 1, and

Fig. 5 is a bottom view of the structure shown in Figure 1, with the slide holders in folded relation to one another.

Fig. 1 shows a slide holder 15 which has a top 16, a bottom 17 and side portions 18 forming a frame for holding a slide 20 (Fig. 2). There are lugs 21, 22 and 23 extending from the side portions 18 for maintaining the slide in position, the lugs 21 and 23 being located in front of the slide, and the lugs 22 being located behind the slide. The lower edge of the slide 20 rests on a shoulder 25 along the bottom portion 17 of the slide holder. There are large recesses 26 in the shoulder 25 to receive cement for securing the slide in the holder.

There is a recess 29 in the bottom of the slide holder, and this recess has shoulders at its opposite ends, preferably a straight or flat shoulder 30 at one side, and a round shoulder 31 at the other side. These shoulders are unsymmetrically located with respect to the center of the slide holder, the rounded shoulder 31 being nearer to the center of the slide holder than is the flat shoulder 30, for reasons which will be explained in connection with the guiding of the slides when in folded relation with one another. The recess 29 is used also in cooperation with apparatus for causing the slides to move into folded relation with one another.

At the top of the slide holder, the side portions 18 extend for some distance above an upper edge 33 which is the top edge of the slide holder frame. There is a clip 35 with turned over ends that hook over the upper ends of the side portions 18. This clip extends across the slide holder at a level above the top of the slide 20, and the clip has a tab 37 which extends through an opening 39 in the top of the frame. The tab 37 prevents the clip 35 from coming off the slide holder.

When it is necessary to remove the clip 35 in order to replace a slide, the mid portion of the clip 35 is flexed away from the opening 39 so as to withdraw the tab 37 from the opening, and it is a feature of the invention that the clip 35 is made of resilient and flexible material which is thin enough to be easily bent to withdraw the tab from the opening. The slide 29, being held against rearward movement by the lugs 21 and 23, can exert no pressure in a direction to flex the clip 35 away from the opening 39.

At the upper end of the clip 35 there are index notches 41. The clips for different slide holders have different numbers of index notches 41, or have one or more indexed notches located at different distances from the ends of the clip, for causing different combinations of control fingers to be operated by the clip 35 when the respective slide holders are in position for projection, or in some other position at which it is desirable to cause control apparatus to operate.

The slide holder 15 is connected with another slide holder 45 which is preferably of identical construction with the slide holder 15. At the left hand end of the slide holder 15, there is a gear segment 47 which extends beyond the side portion 18 of the slide holder and into mesh with a complementary gear segment 49 extending beyond the side portion of the adjacent slide holder 45. There is a bore 51 at the center of each of the gear segments 47 and 49, and the bore 51 is coaxial with the axis of the gear segment.

These slide holders 15 and 45 are joined by a link 54, which has the shape of an inverted U, and the sides of the U extend downwardly into the bores 51 in the respective gear segments 47 and 49. The downwardly extending portions of the link 54 fit into these bores with running clearances and provide pivot bearings at the opposite ends of the link 54. The "effective length" of the link 54 is the distance between the axes of its pivot connections with the slide holders 15 and 45.

The pitch diameters of the gear segments 47 and 49 are substantially equal to the effective length of the link 54 so that the link holds these gear segments 47 and 49 in proper relation for them to roll on one another as the slide holders swing about their pivot connections to the link 54. It is a feature of the invention that the pitch diameters of the gear segments 47 and 49 are at least equal to the thickness of each of the slide holders so that when the slide holders swing on their link connections, they can come into parallel relation with one another as shown in Fig. 5.

Referring again to Fig. 1, there is a gear segment 57 at the right hand side of the slide holder 15, and this gear segment 57 is identical with the gear segment 49 at the right hand side of the slide holder 45. The gear segment 57 meshes with a gear segment 59 of a slide holder 60 to which the slide holder 15 is joined by a link 64. This link 64 is identical with the link 54 at the other end of the slide holder 15.

Any number of slide holders of identical construction can be connected together by similar gear and link connections to form an endless chain of slide holders. When the links that connect the slide holders are in substantial alignment with the slide holders, as shown in Fig. 1, the slide holders are in "extended relation" with respect to one another. When the slide holders swing on their link connections into the positions indicated in Fig. 5, the slide holders are in "folded relation" and in this position they are substantially parallel with one another, that is, the front of one slide holder extends across the back of the next adjacent slide holder. The most compact relation is obtained by having the pitch diameters of the gear segments equal to the thickness of the slide holders as shown, but larger gear segments can be used with corresponding increase in the length of the links 54, 64 and the slide holders can be folded, though the successive slide holders will not be in such compact relation.

The slide holder chain of this invention is intended for use in a guideway having a wide portion along which the chain is advanced while the slide holders are in folded relation with one another. Such a guideway preferably has a bottom 65 on which the slide holders rest and a ridge 66 extending upward from the bottom for guiding the assembly of slide holders as they pass along the guideway. The ridge extends into the recess 29 of each of the slide holders.

When the slide holders are folded, as indicated in Fig. 5, the rounded shoulders 31 of alternate slide holders are located at the same side of the folded group of slide holders, and the flat shoulders 30 of alternate slide holders are spaced back from the line of rounded shoulders 31. The advantage of this construction is that the rounded shoulders 31 come into contact with the side of the guide ridge 66 along which the group of folded slide holders is advanced, while the flat surfaces never contact with the guide ridge and consequently are not subject to wear. The flat surface can be used, therefore, to register the slide holders at the projection station in projectors that have provision for registering the slides in this way.

Slide holders between those which have their rounded shoulders in contact with the guiding ridge 66 are not guided except indirectly through their connections with the slide holders that do contact with the ridge 66.

The slide holder is of reduced thickness along the side portions 18 so that when the slide holders are in folded relation there is space between the side portions 18 of the adjacent slide holders. This provides a clearance into which a claw or other mechanism can be inserted and then moved in a direction to contact with the rearward face of the side portion 18 of the slide holder immediately ahead of the claw to feed the folded slide holders forward along the guideway of the projection apparatus with which they are used.

There is a flange or shroud 70 at the upper end of the gear segment 59. This shroud provides a wall at the upper end of the spaces between the teeth of the gear segments 59. There is a recess 72, however, in the shroud 70 at the upper end of the centrally located space between the teeth of the gear segment 59, that is, the space engaged by the center tooth of the gear segment 57 when the slide holders are in extended relation.

The teeth of the gear segment 57 are somewhat shorter than the teeth of the gear segment 59 with the exception of the center tooth of the gear segment 57, and this center tooth extends for the combined height of the gear segment 59 and the shroud 70.

A lug 75 extends out from the side portion 18 at an elevation just above the link 64. Before the link 64 is initially inserted into the center bore or opening of the gear segment 57, the lug 75 has a slot 77 through which the link 64 can pass, provided that the link is aligned with the slot 77. After the link 64 has been inserted into the gear segment 57, however, a tab 78 at the outside of the slot 77 is bent inward to the position indicated by dotted lines in Fig. 4, and when in this position, the tab 78 prevents the end of the link 64 from being withdrawn from the gear segment 57.

In order to insert the other end of the link 64 into the center bore or opening of the gear segment 59, it is necessary to bring the gear segment 57 downward into mesh with the gear segment 59. This can be done only when one of the teeth of the gear segment 57 is brought into mesh with the portion of the gear segment 59 which is in line with the notch 72 of the shroud 70.

The meshing of the proper teeth of the gear segments 57 and 59 is insured because of the fact that the center tooth of the gear segment 57 is longer than the teeth of the gear segment 59 and extends upward into the notch 72. If any gear tooth of the segment 57, other than the center tooth, is meshed with the space of the gear segment 59 in line with the notch 72, the long center tooth of the segment 57 will strike against the periphery of the shroud 70 when the slides are folding in one direction and prevent proper folding of the slides. This will be immediately apparent to anyone who is connecting the slides together and will cause the person connecting the slides to withdraw the gear segments from improper mesh with one another and insert the long tooth of gear segment 57 into that space of gear segment 59 which is in line with the notch 72.

When the slide holders are in folded relation, the gear segments 57 and 59 cannot come out of mesh with one another. The link 64 prevents them from coming out of mesh in a direction transverse of their axes. If the gear segment 57 moves upward with respect to the gear segment 59, the teeth of the gear segment 57 strike the shroud 70 and prevent any further upward movement of this gear segment with respect to the gear segment 59.

If the gear segment 59 is moved upward with respect to the gear segment 57, it will lift the link 64 into contact with the tab 75, and the tab will stop any further upward movement of the gear segment 59 with respect to the gear segment 57. It is apparent, therefore, that when the slide holders are in folded relation with respect to one another, the lifting of one slide holder will lift the next adjacent slide holder, and it is thus possible to pick up the entire group of folded slide holders by merely lifting the end holders.

In the use of the slide holder chain of this invention, the slide holders are preferably supported in a vertical position on an endless guideway on which the lower ends of the slide holders travel. The slide holders are maintained in extended relation with respect to one another as they travel past a projection or display station. Beyond the projection or display station the guideway in which they travel broadens out to a width somewhat greater than the length of the respective slide holders and means are provided for causing the slide holders to move first into a zig-zag relation with respect to one another, and then into the folded relation shown in Fig. 5.

In this folded relation, the individual slide holders occupy very little length of the guideway and a large number of slide holders can be accommodated in a guideway of comparatively short length. Suitable means are provided for advancing the slide holders along the guideway; and when an endless chain of slide holders is used in an endless guideway, repeated displays of the sequence of slides can be given without having to reverse the feeding mechanism or otherwise to return the slides to starting position.

The preferred embodiment of the invention has been shown and described, but changes and modifications can be made, and some features of the invention can be used alone, or in combination, without departing from the invention as defined in the claims.

We claim:

1. A chain for moving slides into position successively at a projection station, said chain including a plurality of individual slide holders, a link connecting each slide holder with the next successive slide holder and having pivotal connections with both of the slide holders that it connects, and gear segments on the respective slide holders at the ends of the slide holders and at opposite ends of the link, said gear segments having pitch diameters substantially equal to the effective length of the link so that the teeth of the gear segments of the connected slide holders mesh with one another and maintain the slide holders in a predetermined relation with one another as they shift from an extended to a folded condition with the slide holders parallel with one another.

2. Apparatus for holding a plurality of slides, including, in combination, a number of individual slide holders each of which has gear segments at its opposite ends, a link connecting each slide holder with the next preceding and next successive slide holder, said link being of such length that it holds the gear segments of adjacent slide holders in mesh with one another, each of the links being connected at its opposite ends to the slide holders by pivotal connections that have their axes in line with the centers of the gear segments, and abutments at the ends of the depressions between some of the teeth of the gear segment at one end of the slide holder in position to prevent axial movement of the teeth of the gear segment that meshes with said depressions.

3. The combination, with a plurality of slide holders, of gear segments on the ends of successive slide holders in position to mesh with one another when the slide holders are in a predetermined relation with one another, a shroud extending over the upper end of the gear segment of one slide holder in position to prevent the gear segment of the other slide holder from moving upward with respect to the shroud, a link connecting the slide holders and comprising a U-shaped element with opposite sides of the U extending downward through openings that are coaxial with the gear segments, and a lug extending outward from said other slide holder immediately above a portion of the link in position to prevent the link from pulling upward out of the opening in said other slide holder.

4. Apparatus for holding a number of slides for successive display, said apparatus, including in combination, a plurality of individual slide holders, connections between successive holders including a link pivotally connected at its opposite ends with the respective holders, said link being located near the lower ends of the slide holders and comprising the only connection by which the slide holders are held together, and a recess extending from the lower edge of each slide holder intermediate the opposite ends of the length of the slide holder and extending across the full thickness of the lower edge of the slide holder, said recess having an upwardly extending guide surface for cooperation with a guideway of apparatus along which the slide holders are advanced while held in assembled and predetermined relation to one another by said link.

5. Slide holding apparatus comprising a plurality of slide holders, each of which has a frame for retaining a slide in a fixed position with relation to the holder, links at opposite ends of each slide holder connecting that slide holder with adjacent slide holders, each of said links being of a length substantially equal to the thickness of the slide holders so that the adjacent slide holders can fold substantially flat against one another while connected by said links, a portion of each slide holder on at least one end of the slide holder intermediate the front and back of the slide holder being of reduced thickness and having a vertically extending surface for engagement by a feed claw to advance a group of slide holders when they are folded substantially flat against one another and held in a predetermined assembled relation by said links.

6. A plurality of slide holders, links between successive slide holders, each of said links having its opposite ends connected with the successive slide holders by pivotal connections with substantially parallel axes, a gear segment on each of the slide holders with a center substantially in line with the pivotal connection between the slide holder and the link, said gear segments having pitch diameters substantially equal to the effective length of the link so that the teeth of the gear segments of the connected slide holders mesh with one another and maintain the slide holders in a predetermined relation with one another as they shift from an extended to a folded condition, one of said gear segments having a tooth that differs from the other teeth of the segment and that can be meshed with only one particular space between the teeth of the gear segment on the other slide holder so that the gear segments cannot roll upon one another to fold the slide holders except when the slide holders are connected with the gear segments correctly meshed with one another.

7. A slide holder chain comprising a plurality of slide holders, each of which has a frame for holding a slide in a fixed position with respect to the holder, links connecting successive slide holders, and each of which has an effective length substantially equal to the thickness of the slide holders so that slide holders can be swung into a folded condition substantially parallel with one another, pivotal connections at opposite ends of the links securing the links to the respective slide holders, gear segments on the adjacent ends of the successive slide holders with centers on the axes of the pivotal connections of the link with the slide holders, each of said gear segments having a pitch diameter substantially equal to the effective length of the link so that the gear segments roll upon one another to rock each slide about its pivotal connection with the link when the link is swinging about its pivotal connection with the other slide, a shroud covering the upper ends of the spaces between the teeth of one gear segment, a gap in the shroud leaving the space between two particular teeth of the shrouded gear segment unobstructed at the end, and a tooth of the other gear segment longer than the other teeth and having sufficient height to extend up into the gap in the shroud when the successive slide holders are in a predetermined relation to one another.

References Cited in the file of this patent

UNITED STATES PATENTS

| Number | Name | Date |
|---|---|---|
| 713,983 | Jackson | Nov. 18, 1902 |
| 1,022,743 | Kellum | Apr. 6, 1912 |
| 1,189,419 | Bach | July 4, 1916 |
| 1,850,903 | Tryon | Mar. 22, 1932 |
| 1,930,421 | Ehmer | Oct. 10, 1933 |
| 1,934,107 | Waite | Nov. 7, 1933 |
| 2,007,561 | Conn | July 9, 1935 |
| 2,072,028 | Cooper | Feb. 23, 1937 |
| 2,152,495 | Otto | Mar. 28, 1939 |
| 2,395,191 | Newman | Feb. 19, 1946 |
| 2,532,776 | Tinser | Dec. 5, 1950 |